United States Patent

Leatherman

[15] 3,652,361
[45] Mar. 28, 1972

[54] PROCESS FOR INDUCTION HEATING

[72] Inventor: Alfred F. Leatherman, 4256 Mountain Road, Columbus, Ohio
[73] Assignee: William C. Heller, Jr.
[22] Filed: Dec. 1, 1969
[21] Appl. No.: 881,171

Related U.S. Application Data

[62] Division of Ser. No. 497,381, Oct. 18, 1965, Pat. No. 3,510,619.

[52] U.S. Cl....................156/272, 156/276, 156/380, 219/10.53
[51] Int. Cl...................................B23k 13/00
[58] Field of Search...........156/272, 273, 380, 276; 117/93.2, 22, 31; 263/52; 219/10.79, 10.53

[56] References Cited

UNITED STATES PATENTS

| | | | |
|---|---|---|---|
| 2,393,541 | 1/1946 | Kohler | 156/273 X |
| 2,715,170 | 8/1955 | Sorensen | 219/10.53 |
| 3,396,258 | 8/1968 | Leatherman | 156/272 X |
| 3,462,336 | 8/1969 | Leatherman | 156/272 |

Primary Examiner—Carl D. Quarforth
Assistant Examiner—E. E. Lehmann
Attorney—Andrus, Sceales, Starke & Sawall

[57] ABSTRACT

An induction heating process provides a localized high frequency magnetic field by interacting a central high frequency magnetic field with a surrounding high frequency magnetic field. The localized magnetic field may be used to inductively heat nonmetallic material by means of a susceptor.

3 Claims, 3 Drawing Figures

PATENTED MAR 28 1972                               3,652,361

INVENTOR
A.F. LEATHERMAN

By Daniel D. Fetterley
ATTORNEY

PROCESS FOR INDUCTION HEATING

CROSS REFERENCES TO RELATED APPLICATION

This application is a divisional application of my copending application Ser. No. 497,381, filed Oct. 18, 1965, now issued as U.S. Pat. No. 3,510,619, on May 5, 1970.

BACKGROUND OF THE INVENTION

Description of the Prior Art

Induction heating is a thermal process in which, in its well-known forms, electrical energy in the form of a high intensity, high frequency magnetic field is applied to a metallic substance. The field induces eddy currents, or hysteresis losses, which cause heat to be generated in the substance itself. This method has been in common use for melting and heat treating metals for a number of years.

Induction heating may also be used in the thermal processing of nonmetallic materials, such as plastics, by placing inductively heatable substances, as for example, certain metal or metal oxide structures or particles, at points in the material where heat is desired, and then placing the composite structure in an alternating magnetic field. For example, if it is desired to join two sheets of plastic such as polyethylene, fine metal or metal oxide particles, or a metallic screen, may be placed between the sheets at the points desired to be joined. When a magnetic field is applied to the sheets, the particles or screen become heated, softening the plastic and allowing the two sheets to fuse. The metallic particles or structure is generally termed a "susceptor" to indicate its capability of being heated by a magnetic field.

The above method of thermal processing differs from dielectric thermal processing in which a nonmetallic substance is itself heated by a high frequency electric field. Di-electric thermal processing involves considerations not here pertinent.

The advantages of induction thermal processing include the fact that heat is generated within the material itself at the location where it is to be used, thereby providing ideal temperature distributions and permitting accurate and beneficial control of temperature. Additionally, since heat is not required to flow from an external source through the material to the desired location, substantial increases in the rate of thermal processing are obtainable. The accurate temperature control and shortened exposure times prevent thermal damage, such as charring, warping, or distortion from occurring during the processing.

It is necessary, in order to obtain the above advantages to utilize in the process a magnetic force, or field, of the highest possible intensity and of the highest possible frequency in order to generate the largest amount of heat by induction losses. The equipment used to generate such a field in the process generally consists of a field producing apparatus (e.g., "work coil") coupled to a high frequency source. The attainment of both the aforementioned criteria depends to a great extent upon reducing the inductance of this apparatus to the lowest possible value.

An excessive amount of inductance in the apparatus limits the magnitude of the high frequency current flowing through the apparatus and hence the intensity of the magnetic field generated thereby. While a greater applied voltage may be used to increase current flow, this may result in inefficient operation of the field producing apparatus. The size of the field producing apparatus may also be reduced to lower the inductance but often only at the expense of a decrease in processing speed or capacity of the equipment.

Further, it is generally desirable to operate the apparatus in parallel resonance with the power source, as current flow at such a frequency is maximized. Resonant frequency is determined by the formula $f_r = 1/2\pi\sqrt{LC}$. A low value of inductance permits the resonant frequency of the apparatus to be high enough to generate induction losses of the required magnitude. For example, a resonant frequency of 4 megacycles may be required in thermal processing nonmetallic materials. This is significantly above the frequencies required for metallurgical uses which generally range from 3 kilocycles to 450 kilocycles.

It is also desirable to direct or channel the magnetic field used in the process so as to concentrate or localize as much of it as possible in the material being thermally processed. Flux not so utilized performs no useful function and unless cancelled out or reduced increases the inductance of the apparatus unnecessarily.

SUMMARY

It is the object of the present invention to provide an improved process of inductively heating nonmetallic materials which process obtains accurate temperature control at high processing speeds without the risk of thermal damage to the material, such process being particularly adapted for use in sealing or uniting nonmetallic materials.

Briefly, the present invention provides a process for inductively heating a nonmetallic material. Initially a susceptor is applied to the nonmetallic material to be treated by heating. An enclosed, central high frequency magnetic field is then generated within a predetermined work area while an additional enclosed high frequency magnetic field is simultaneously generated adjacent said work area and partially surrounding said central magnetic field. The surrounding field interacts with the central field for forming a localized high frequency magnetic field from a portion of said central magnetic field and for eliminating major portions of said surrounding field. The material with the susceptor is placed in the localized high frequency magnetic field, thereby to inductively heat the susceptor and heat the material by conduction.

The manner in which this is accomplished, together with other features of the invention, may be better understood by reference to the following specification and drawings, forming a part thereof, in which:

DESCRIPTION OF THE PREFERRED EMBODIMENT

Figure 1:
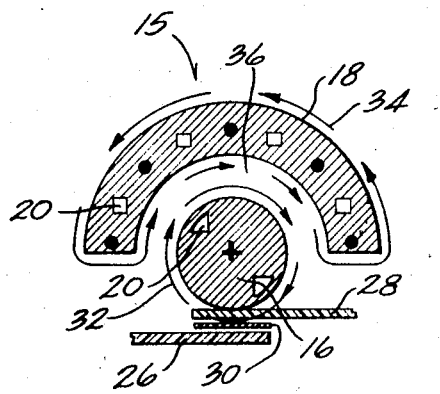
FIG. 1 is a diagrammatic view of a fully coaxial current-carrying conductor.

As an understanding of the principles of coaxial conductors is necessary for an appreciation of the apparatus used in the process of the present invention, reference is initially made to FIG. 1 showing a coaxial conductor 4 having a central current-carrying portion 6 and an outer, cylindrical, current-carrying portion 8 of thickness $t$. An annular space 10 exists between central portion 6 and outer portion 8. For purposes of analysis, the central portion 6 may be assumed to be carrying current into the plane of the drawing, as indicated by the conventional symbol showing the tail of the current arrow, while the outer portion 8 returns the current out of the plane of the paper toward the viewer, as indicated by the conventional symbol showing the point of the current arrow. In accordance with electromagnetic principles, the current flow through portion 6 generates a magnetic field 12 encircling that portion in the manner indicated by the arrow. The return current in the outer portion 8 generates no magnetic field due to cancellation by magnetic field 12. The several widely recognized advantages of coaxial conductors result from the fact that essentially no magnetic field exists outside such devices.

While the completely coaxial conductor 4 expresses the low inductance characteristic desired of an apparatus utilizable in induction heating processes, it is totally unsuited for such a purpose because essentially no magnetic field exists around the outside of outer portion 8.

Figure 2:
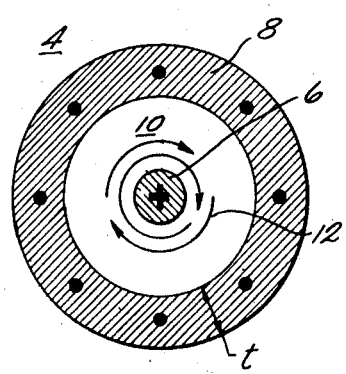
FIG. 2 is a cross-sectional view of an induction heating apparatus showing the process of the present invention.

FIG. 2 shows an induction heating apparatus 15 employing the aforementioned principles of coaxial conductors to reduce the inductance thereof while also providing a localized external magnetic field suitable for induction thermal processing.

Specifically, the apparatus includes a central current-carrying portion 16 and an outer, return, current-carrying portion 18. Outer portion 18 only partially surrounds central portion 16. For example, outer portion 18 may extend around central portion 16 for approximately one-half the circumference of the latter. Both central current-carrying portion 16 and outer portion 18 may be constructed from a good electrical thermal conductor, such as copper, which may contain coolant passages 20 through which a liquid coolant may be circulated. The current-carrying portions of apparatus 15 may be cooled by convection or conduction if desired.

Space 36 between central portion 16 and outer portion 18 may be left open to allow cooling air to circulate therethrough or may be filled with a nonmagnetic electrically insulating substance to add rigidity and structural strength to induction heating apparatus 15.

Figure 3:
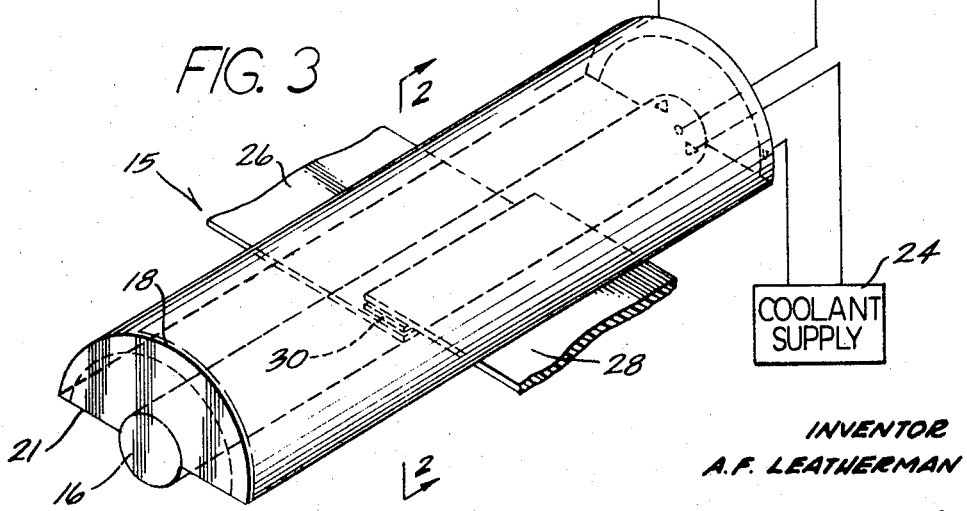
FIG. 3 is a perspective view of an induction heating apparatus also illustrating the performance of the process of the present invention.

Portions 16 and 18 are electrically connected at one end to high frequency source 22, as shown in FIG. 3, and electrically joined at the other end by a conductor 21. High frequency source 22 supplies high frequency alternating current to portions 16 and 18. For example, the output frequency of high frequency source 22 may be 4 megacycles. Coolant supply 24 is connected to coolant passages 20 to circulate a coolant through portions 16 and 18.

In operation, high frequency source 22 provides high frequency current to portions 16 and 18. For purposes of analysis, such current flow is shown instantaneously in FIG. 2 as proceeding down central portion 16 into the plane of the paper and returning through portion 18 out of the plane central portion 16, the direction of which is shown by the arrows. Similarly, an oppositely directed magnetic field 34 is generated by the current flowing in the opposite direction through outer portion 18, which in this case will have an external component. Because most of the field 34 of outer portion 18 is cancelled by the opposite direction of the two magnetic fields, the inductance of the apparatus is small.

The magnetic field around the lower circumference of portion 16 is not so eliminated, however, and remains localized about the lower circumference of portion 16 to inductively heat a responsive substance placed in the field.

When the current from high frequency source 22 reverses, the direction of magnetic fields 32 and 34 also reverse. The part of magnetic field 32 around the lower circumference of central portion 16 reverses in its polarity to continue to provide a high frequency magnetic field necessary for induction thermal processing.

FIGS. 2 and 3 show the use of the above-described heating apparatus in the process of the present invention to join plastic sheets 26 and 28 by means of a layer of iron oxide particles 30 capable of being inductively heated by the magnetic field produced by the apparatus. Sheets 26 and 28 are arranged in overlapping configuration with the layer 30 between the overlapping portions. The sheets are then placed adjacent the lower circumference of central portion 16 and within the magnetic field 32 surrounding this circumferential segment of portion 16. Magnetic field 32 inductively heats the particles of layer 30 softening the overlapping edges of plastic sheets 26 and 28 to form a bond between them. When the plastic sheets have been sufficiently softened, high frequency source 22 may be turned off allowing the coolant in passages 20 to solidify the bonded area.

I claim:

1. A process for inductively heating a nonmetallic material comprising of steps of:

applying a susceptor to a nonmetallic material to be treated by heating;

providing a localized high frequency magnetic field by spacedly positioning a central current-carrying member within a partially surrounding current-carrying plate to define an open peripheral segment along the bar, and connecting the bar and plate to a high frequency power supply to generate a localized magnetic field along the open peripheral segment of the bar; and placing the material with the susceptor in the localized high frequency magnetic field, thereby to inductively heat the susceptor and heat the material by conduction.

2. The process according to claim 1 comprising an induction heating process wherein said material comprises a plurality of layers of thermoplastic material to be sealed together, and the susceptor comprises a layer of iron oxide particles applied between the layers.

3. The process according to claim 1 further defined as including the step of cooling the bar to cool the material after induction heating.

* * * * *

UNITED STATES PATENT OFFICE
CERTIFICATE OF CORRECTION

Patent No. 3,652,361            Dated     March 28, 1972

Inventor(s)      Alfred F. Leatherman

It is certified that error appears in the above-identified patent and that said Letters Patent are hereby corrected as shown below:

| | | |
|---|---|---|
| Col. 3 | line 34 | After the word "plane" and before "cen-" insert ---of the paper. A magnetic field 32 is generated by the current flowing through--- |
| Col. 4 | line 24 | Delete the word "of" in the first instance and insert ---the--- |
| Col. 4 | line 28 | Delete the word "member" and insert ---bar--- |
| Col. 4 | line 32 | Delete the word "supply" and insert ---source--- |
| Col. 4 | lines 34, 35 and 36 | Delete "placing the materials with the susceptor in the localized high frequency magnetic field, thereby to inductively heat the susceptor and heat the material by conduction." and insert ---inductively heating the susceptor and heating the material by conduction by placing the material with the susceptor immediately adjacent the open peripheral segment of the bar.--- |

Signed and sealed this 9th day of January 1973.

(SEAL)
Attest:

EDWARD M. FLETCHER, JR.            ROBERT GOTTSCHALK
Attesting Officer                     Commissioner of Patei